No. 818,209.　　　　　　　　　　　　PATENTED APR. 17, 1906.
F. L. O. WADSWORTH.
APPARATUS FOR THE MANUFACTURE OF SHEETS OF GLASS.
APPLICATION FILED JULY 29, 1905.

3 SHEETS—SHEET 1.

WITNESSES

INVENTOR

No. 818,209. PATENTED APR. 17, 1906.
F. L. O. WADSWORTH.
APPARATUS FOR THE MANUFACTURE OF SHEETS OF GLASS.
APPLICATION FILED JULY 29, 1905.

3 SHEETS—SHEET 2.

WITNESSES
INVENTOR

No. 818,209. PATENTED APR. 17, 1906.
F. L. O. WADSWORTH.
APPARATUS FOR THE MANUFACTURE OF SHEETS OF GLASS.
APPLICATION FILED JULY 29, 1905.

3 SHEETS—SHEET 3.

WITNESSES
R A Balderson
Warren W Swartz

INVENTOR
Frank L. O. Wadsworth

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF NEW YORK, N. Y., A CORPORATION OF WEST VIRGINIA.

APPARATUS FOR THE MANUFACTURE OF SHEETS OF GLASS.

No. 818,209.       Specification of Letters Patent.       Patented April 17, 1906.

Application filed July 29, 1905. Serial No. 271,798.

*To all whom it may concern:*

Be it known that I, FRANK L. O. WADSWORTH, of Morgantown, Monongalia county, West Virginia, have invented a new and useful Apparatus for the Manufacture of Sheets of Glass, of which the following is a full, clear, and exact description, reference being had to the accompanying drawings, forming part of this specification, in which—

Figure 1:
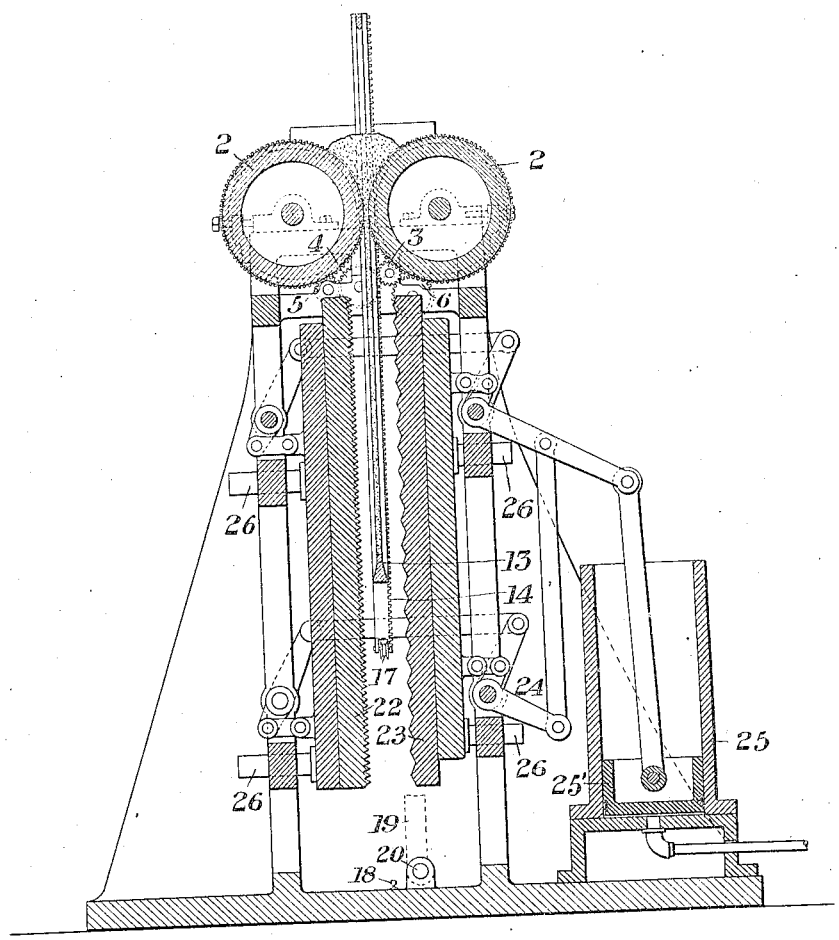
Figure 2:
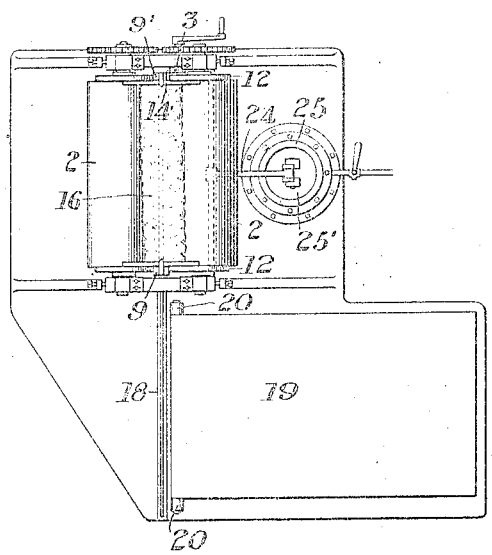
Figure 3:
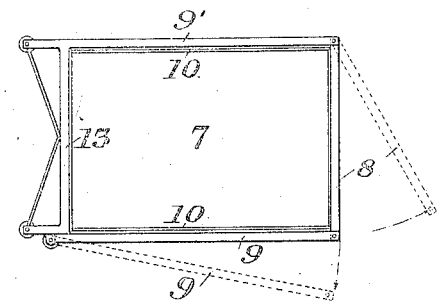
Figure 4:
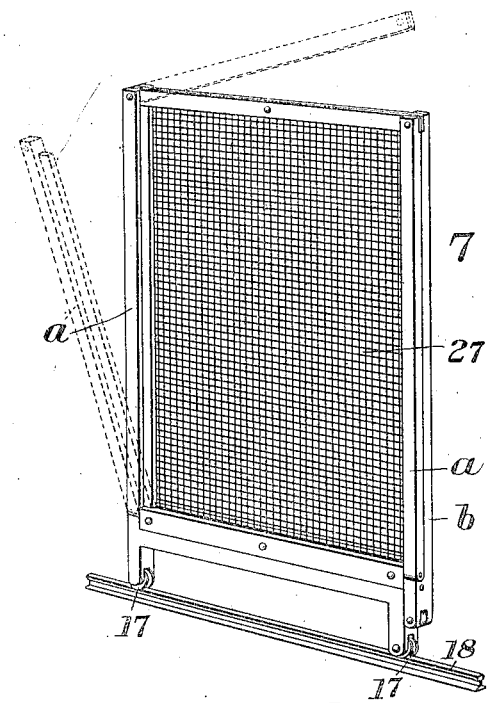
Figure 5:
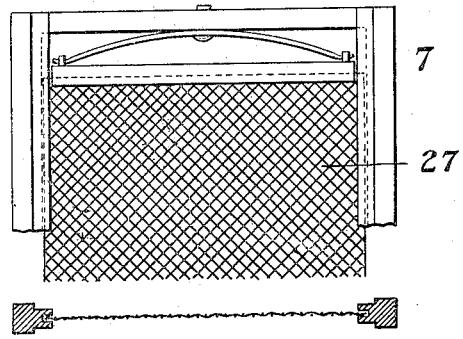

Figure 1 is a vertical section of my machine. Fig. 2 is a plan view. Fig. 3 is a detail of the frame for holding the glass sheet. Fig. 4 is a perspective view of a modified form of frame which I may employ in making wire-glass, and Fig. 5 is a detail view showing in side elevation and cross-section a modification of the frame.

Attempts have been made heretofore to roll glass sheets by causing the plastic glass to pass between two forming-rolls in a manner similar to the rolling of metal; but, so far as I know, these attempts by others have been unsuccessful, and I believe that the cause of the unsuccess has been the lack of means for holding and controlling the glass as it emerged from the rolls, and thus preventing distortion of the sheet.

My invention is designed to provide means by which rolls can be used successfully for this purpose and glass sheets thus produced very rapidly and with both surfaces of equal quality. Where a roll and a rolling-table are used, as in the process ordinarily employed, the side of the sheet formed in contact with the table is always of inferior finish.

My invention consists in apparatus for rolling a glass sheet between rolling-surfaces, and as the sheet is delivered from the rolls simultaneously supporting it in contact with the air on both sides with a support which travels with the glass.

In the drawings, in which I show apparatus suitable for the practice of my invention, 2 2 are the forming-rolls, journaled in suitable supports and driven at equal speed by gearing 3 4 5 6.

For the purpose of supporting the glass as it is rolled I employ a frame 7, (shown in Figs. 3 and 4,) two of the marginal bars of which are hinged, as shown at 8 9 in Fig. 3. The frame is of the size of the sheet desired to be rolled. The inner edges of its side bars 9 9' are contracted in thickness, as at 10, to the thickness desired for the sheet. In order that the frame may be passed between the rolls, the bar 8 is of the same thickness as the sheet desired, and the rolls have reduced portions 12 at their ends for the passage of the side bars 9 9'. The bottom bar 13 has its upper surface shaped, as shown in Fig. 1, so as to fit between the rolls on the delivery side of the pass. The frame has a rack 14, which meshes with the driving-pinion 3, so that as the rolls rotate the frame will be moved between them at the same surface speed.

In the practice of my invention the frame is retracted until the end bar 13 fits within and closes the roll-pass, and a body of plastic glass 16 is then delivered to the rolls. As the rolls rotate the glass will be rolled into the form of a sheet, its lower edge being attached to the bar 13, and as the frame travels between the rolls at the same rate as the sheet the glass will attach itself to the side bars and will be supported thereby, so that when the frame is finally delivered it will contain a glass sheet attached at its edges and supported and held thereby. Being thus supported by the frame and in contact with the air on both its faces, a sheet of very fine finish is produced. When the frame is delivered from the rolls, it is removed and the finished sheet detached. For this purpose I prefer to provide the frame with wheels 17, adapted to rest upon a rail 18 when the frame is at its lowest position. The frame carrying the sheet can then be moved edgewise opposite to a table 19, which is hinged at 20 and stands in a vertical position. The frame is rested against the table and the table is turned back to a horizontal position, so as to support the glass sheet, whereupon the sides 8 and 9 of the frame can be opened, as shown in Fig. 3, and the sheet released therefrom.

If it is desired to impress a figured surface or surfaces or a prism-surface upon the glass sheet, I employ patterned pressure-plates 22 23, set below the rolls on opposite sides of the path of the frame and lever mechanism 24, actuated by hand or by a power-cylinder 25. When the sheet has been delivered from the rolls and the frame is in its lowest position, the piston 25' of the cylinder 25 may be projected, whereupon the pressure-plates will be forced together upon the intermediate glass sheet, and the pattern will be impressed upon the glass. These pressure-plates may have plain surfaces and may be used for the purpose of flattening or straightening the sheet of glass. To guide the pressure-plates and to insure parallelism of motion, I prefer to provide them with guides 26.

My invention is of great utility in the manufacture of wire-glass. For this purpose I may construct the frame, as shown in Fig. 4, with each of its margins formed of two bars $a$ $b$, the bar $a$ being pivoted to the bar $b$. The wire mesh 27 to be embedded in the glass is stretched between the bars of the frame and is held taut by securing the bars together. When the frame thus constituted is passed between the rolls, the glass sheet will be spread on both sides of the wire mesh, producing an even sheet of uniform thickness throughout and with the wire exactly in the middle or at any desired distance from either surface.

Within the scope of my invention as defined in the claims the skilled manufacturer of glass will be able to modify the apparatus in various ways, since

What I claim is—

1. In apparatus for making glass sheets, the combination of rolls, and a frame movable with the glass as it passes from the rolls and by which the sheet is held; substantially as described.

2. In apparatus for making glass sheets, the combination of rolls, and a frame movable with the glass as it passes from the rolls and by which the sheet is held, said frame having separable side portions; substantially as described.

3. In apparatus for making glass sheets, the combination of rolls, and a frame movable with the glass as it passes from the rolls and by which the sheet is held, said frame having its inner edges of contracted thickness; substantially as described.

4. In apparatus for making glass sheets, the combination of rolls, and a frame movable with the glass as it passes from the rolls and by which the sheet is held, the rolls having recessed end portions for the frame; substantially as described.

5. In apparatus for making glass sheets, the combination of rolling mechanism and a frame which receives the glass as it passes from the rolling mechanism and by which the sheet is held, and means whereby a wire mesh may be supported in the frame in position to be embedded in the glass sheet; substantially as described.

6. In apparatus for making glass sheets, the combination of rolls, and a frame movable with the glass as it passes from the rolls and by which the sheet is held, said frame being vertical in position; substantially as described.

7. In apparatus for making glass sheets, the combination of rolls from which the glass is delivered in vertical position, and vertical pressure-plates adapted to press the glass; substantially as described.

8. In apparatus for making glass sheets, the combination of vertical pressure-plates, means by which the formed sheet is delivered between them in vertical position, and means for causing the relative approach of the plates; substantially as described.

9. In apparatus for making glass sheets, the combination of rolls from which the glass is delivered in vertical position, a frame by which the glass is supported, and vertical pressure-plates adapted to press the glass; substantially as described.

10. In apparatus for making glass sheets, the combination of rolling mechanism and a frame movable with and which receives the glass as it passes from the rolling mechanism and by which the sheet is held, and a track upon which the frame is delivered; substantially as described.

11. In apparatus for making glass sheets, the combination of rolling mechanism and a frame movable with and which receives the glass as it passes from the rolling mechanism and by which the sheet is held, a track upon which the frame is delivered, and a receiving-table to which the track leads; substantially as described.

In testimony whereof I have hereunto set my hand.

FRANK L. O. WADSWORTH.

Witnesses:
 G. M. VIERS,
 H. M. CORWIN.